Figure 1:
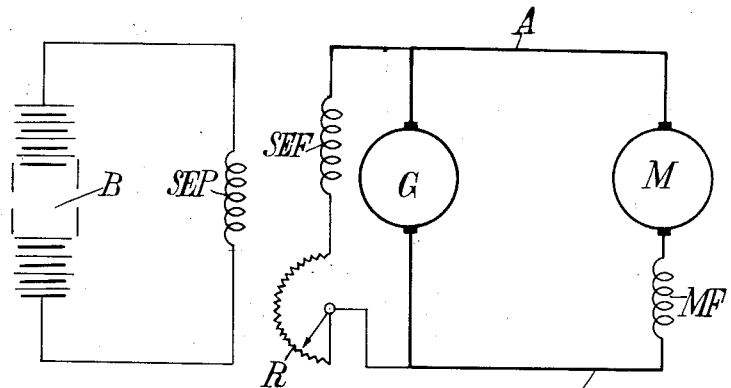

D. J. Watkins
J. H. Abbink-Spaink
D. C. Plyer
Inventors

By: Glascock Downing Seebold
Attys.

March 2, 1937.  D. J. WATKINS ET AL  2,072,781
PRIME MOVER ELECTRIC TRACTION SYSTEM
Filed June 13, 1935   3 Sheets-Sheet 2

Fig.6.a.

D. J. Watkins
J. H. Abbink-Spaink
D. C. Plyer
inventors

By: Glascock Downing &Seals
Attys

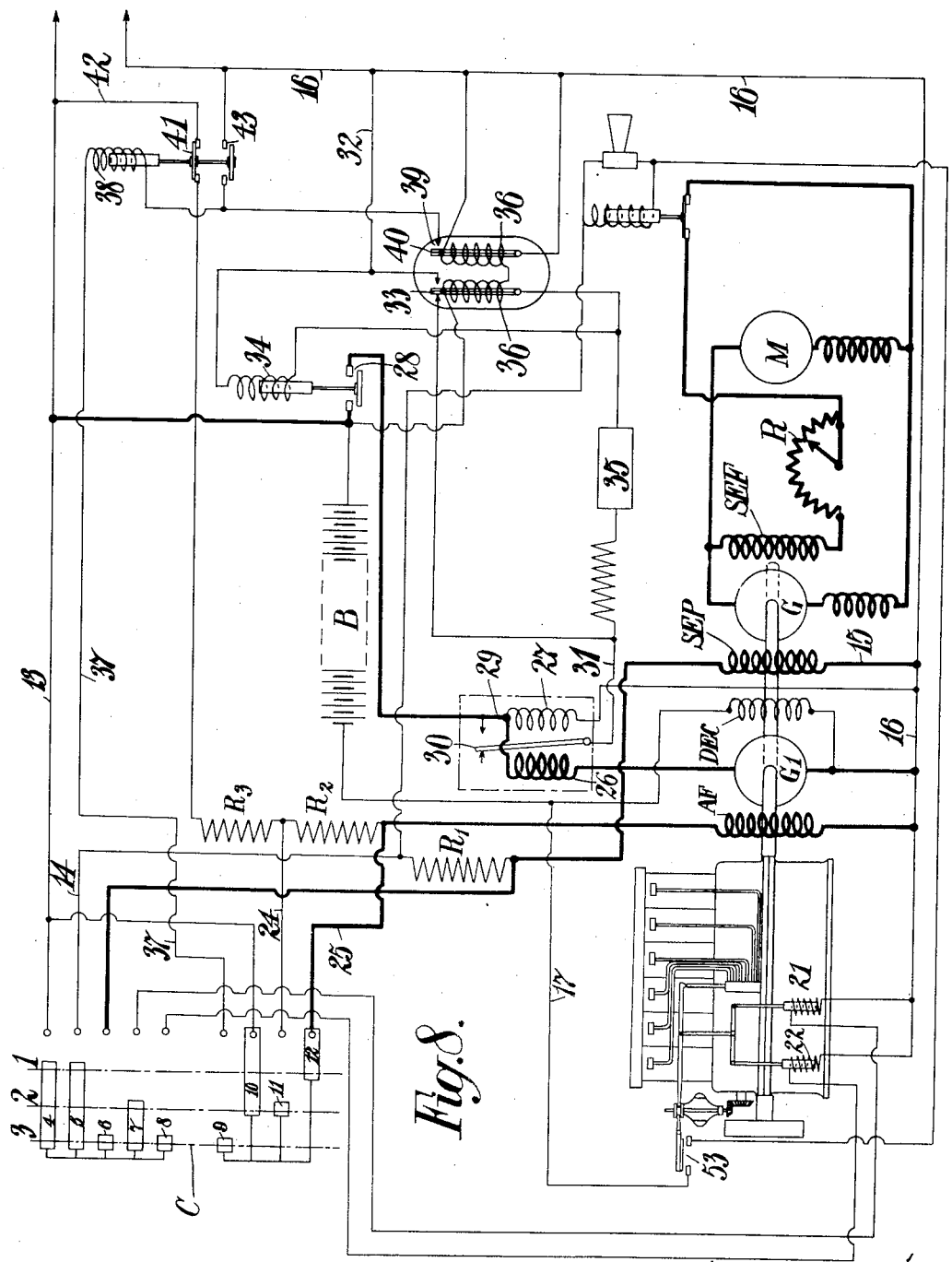

UNITED STATES PATENT OFFICE 2,072,781

PRIME-MOVER-ELECTRIC TRACTION SYSTEM

Donald John Watkins, Johann Hermann Abbink-Spaink, and Donald Challis Plyer, Newcastle-upon-Tyne, England, assignors to Sir W. G. Armstrong Whitworth & Co. (Engineers) Ltd., Newcastle-upon-Tyne, England Application June 13, 1935, Serial No. 26,496

21 Claims. (Cl. 290—17)

The invention relates to electric traction systems comprising a generator driven by a prime mover and an electric motor or motors supplied with current from the generator.

The object of the invention is to increase the efficiency and to simplify the control of vehicles fitted with such traction systems, thereby to secure trouble free operation.

In systems of the above kind it is usual to employ a series wound traction motor and it can be shown that the motor, at low speeds, and for a constant prime mover power, requires a high amperage and a comparatively low voltage. At higher speeds the requirements are reversed, the voltage is high and the amperage is comparatively low.

These requirements for constant prime mover power and varying vehicle speed can be graphically plotted as a hyperbola, the ordinates of which are respectively amperes and volts.

For maximum efficiency, therefore, the generator supplying the motor must, for a predetermined power input, have a regulated output characteristic which follows the above hyperbola.

Now the volt and ampere output of a generator having a separately excited field winding only and constant excitation, can be shown to be of approximately straight line form and by suitable choice of such excitation this line can be made tangential to the required hyperbola characteristic. This shows that at one particular speed only of the motor, will the generator output in volts and amperes agree with the prime mover power output.

It is possible, of course, to obtain the required regulation of the generator by controlling this separate field.

In order to reduce the amount of excitation required for the separately excited field a self-excited field for the generator is provided.

By the addition of this self-excited field winding and the suitable control of the excitation given by this winding, the current through the separately excited field remaining substantially constant, the output of the generator at any motor speed within the working limits may be arranged to coincide with the prime mover output curve, namely a hyperbola.

By suitably proportioning the separately excited field in relation to the self-excited field the regulating means for the self-excited field, to obtain the required generator characteristic, only requires to handle the minimum wattage to obtain such regulation.

It will thus be seen that for a predetermined output of the prime mover the generator is capable of supplying the varying requirements of the traction motor or motors.

In a further form of the invention the generator is provided with a decompounding winding which has the effect of limiting the maximum current generated due to the separately excited field winding. It will be clear that the amount of excitation required from the separately excited field winding if no decompounding turns are used must be comparatively small and expressed graphically as above described, the slope of the curve may have only a small inclination to the horizontal or voltage ordinates. In order to ensure that this curve touches, or lies closely below, the required hyperbola, the excitation may be such that the maximum current which could be taken would reach an extremely high value and would necessitate the use of maximum current control means.

The use of decompounding turns enables the characteristic for the separately excited field winding to be steepened, thus bringing the maximum current down to a permissible value.

It will clearly be understood from the foregoing that by the use of decompounding turns, it may be arranged that should the self excited field become open circuited, through failure of the winding or of the regulator, a generator characteristic is obtained which will enable the vehicle to be started and moved, though the maximum speed obtainable would be lower than normal but greater than that available if no decompounding turns were employed. In this latter case, only a small percentage of the total field can be arranged to be separately excited without the maximum current being exceeded at low vehicle speed.

Figure 2:
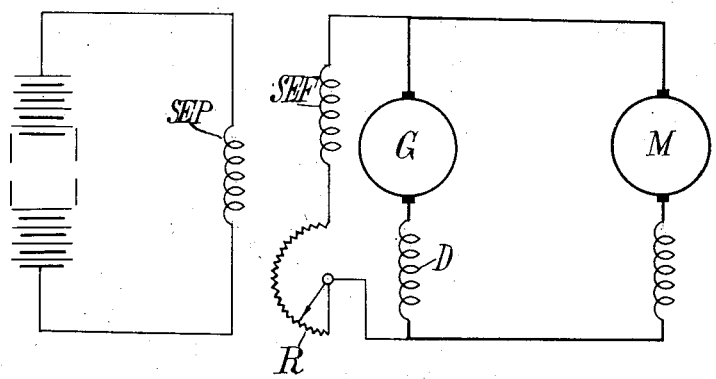
Figure 3:
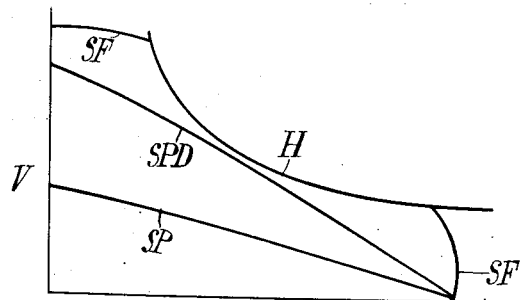
Figure 6:
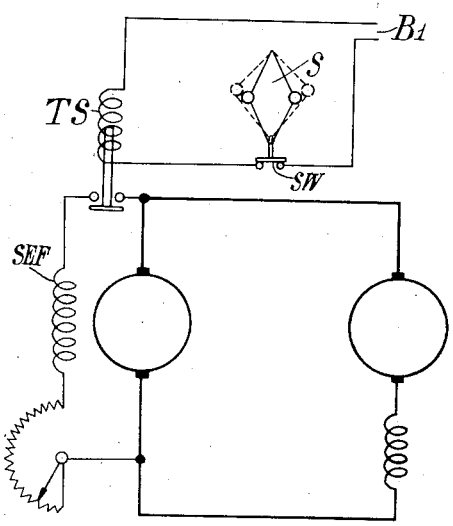
Figure 5:
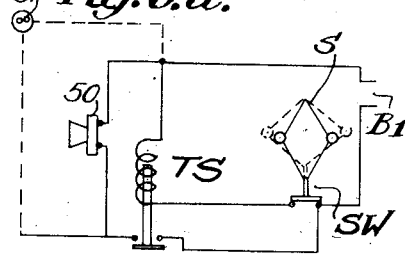
Figure 5:
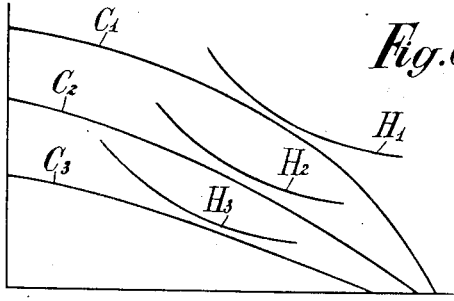
Figure 4:
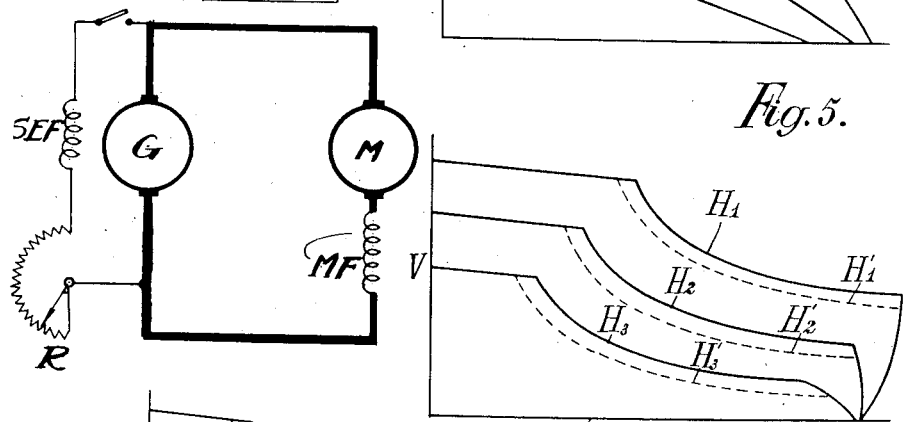
Figure 4:
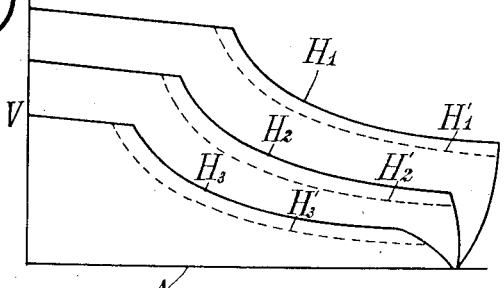
Figure 7:
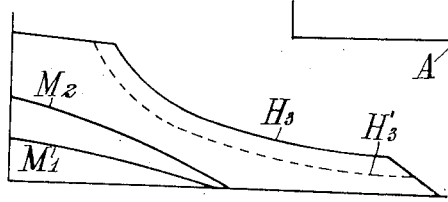

The invention will be described with reference to the accompanying drawings in which:

Figure 1 is a diagram of the electrical circuit of a traction system according to the invention, Figure 2 is a diagram of a modified system, Figure 3 is a graph showing the relationship between the generator characteristics and the prime mover output, Figures 4 and 5 are curves showing the generator characteristics under various conditions of use, Figure 6 is a diagram of an improved form of traction system. Figure 6a shows a modification of the traction system shown in Figure 6, Figure 7 is a graph showing the generator characteristics under certain conditions, and Figure 8 is a diagram of the electrical circuits of a traction installation having battery excited field windings for the main and auxiliary generators.

Referring now to Figure 1, G represents a generator driven by a prime mover, and M a traction motor having a series field winding MF. The generator G is electrically connected to the motor M by main leads A and B and the generator has a self excited field winding SEF. A regulator R such as a variable resistance is inserted in the circuit to control the excitation due to this winding SEF. A further field winding SEP is provided for the generator, this winding being excited by an external source shown in the drawings as a battery B but which may be any auxiliary supply.

Figure 3 shows in graphical form a constant H. P. curve, the vertical datum line being volts and the horizontal datum line being amperes. This curve H is a hyperbola and it will be clear that for a constant input power demand by the generator the voltage and amperage may vary between wide limits.

If a generator is considered having an unregulated, separately excited field winding, said winding being proportioned so that the generator gives a predetermined maximum current, it will be possible to arrange that the volt and ampere output may vary along the line SP. This line meets the horizontal datum line at a point representing the maximum permissible ampere output and it will be seen that the output at any point on this line is considerably below the predetermined constant horse power (H).

If the generator is provided in addition with a self excited field winding, suitably regulated, the output may be arranged to follow the curve H, the portions SF represent the output due to the self excited field winding.

If, however, in a generator having a self excited and a separately excited field winding, the self excited field winding becomes open circuited, the available output from the generator will fall to that denoted by the line SP. This means that, although the vehicle might be started and moved, the maximum speed obtainable with the self excited field out of action would be very low and consequently the prime mover output used would also be extremely low.

It will be appreciated that the excitation due to the separate winding might be increased so that the line SP will lie closer to the curve H, but in this case maximum current control means would have to be employed to limit the current since the line SP would then meet the horizontal ordinate at a point showing a greatly increased ampere output.

This is obviously undesirable, and accordingly a second embodiment of the invention will now be described which removes the above disadvantages.

Referring to Figure 2, the generator G supplying the motor M has a self field winding SEF and a separate field winding SEP. The excitation due to the self field winding is adjustable by means of the regulator R, and decompounding turns D are arranged in the generator field circuit. The effect of these decompounding turns is to reduce the maximum current output and if a generator having a separately excited winding and decompounding turns is considered it is possible to arrange the output to vary along the line SPD.

This curve SPD, by suitable choice of the excitation, may be arranged so that it is tangential to the curve H and that it meets the horizontal datum line at a point representing the maximum permissible current output.

As in the preceding case, by the use of a regulated self excited field winding the output may be made to correspond to the curve H. In this case, should the self excited winding fail, through a fault in the self field or in the regulator, a generator characteristic is obtained which will enable the vehicle to be started and moved, though the maximum speed obtained would be lower than with the self field in operation.

The maximum speed, however, would be greater than that obtained if no decompounding turns were used.

It will be clear from the foregoing that if no decompounding turns are used only a small percentage of the total field can be arranged to be separately excited, without exceeding the maximum permissible current.

Referring now to Figure 4, three curves $H^1$, $H^2$ and $H^3$ show respectively the generator output at three predetermined prime mover speeds, the vertical and horizontal datum lines being respectively volts and amperes.

When the total field of the generator is in order and regulation of the self field is effected as shown in Figures 1 and 2, reduction of the speed of the prime mover will cause a reduction in the generator output as shown by the three curves in Figure 4.

Should the prime mover, however, only be capable of delivering a predetermined portion of its output at a particular prime mover speed, then the generator output characteristic must be altered to suit the new conditions. The curves $H_1'$, $H_2'$ and $H_3'$ show respectively the altered generator characteristics when the above mentioned condition of the prime mover exists and at different speeds of the prime mover.

This alteration is effected by the regulator R (Figures 1 and 2) in the circuit of the self excited winding, which regulator is in operative connection with a load sensitive tachometrical device or other means of control.

It will be clear that the excitation given by the separately excited field remains constant, the output of the generator at different prime mover speeds being such that overloading of the prime mover cannot take place.

It must be understood that should the self excited field be out of action, for example through an interruption in the winding or in the regulator, the predetermined amount of excitation given by the separate field may be so arranged that even if the prime mover is capable of delivering only a predetermined portion of its full output at any particular speed, the generator characteristic will be such that at all train speeds and prime mover speeds the generator output can never exceed the prime mover output.

In the foregoing description, the cases when the prime mover is capable of giving a predetermined portion of its normal full output at a given speed and when the self excited field goes out of action have been discussed.

A further trouble which may be experienced is a defect in the operating mechanism of the self field regulating means, the self field winding being uninterrupted.

Should such a defect occur, the field regulator R may be retained in the weak field position so that the generator output, whilst not being the same as the output obtainable when the regulator is in action, will be greater than the output obtainable if the self field were open circuited.

In Figure 5, the curves H¹, H² and H³ represent the power available on first, second and third speeds of the prime mover, respectively.

The curves C¹, C² and C³ represent the generator characteristics with a weak self field and decompounding in addition to the separately excited field at each of these speeds.

It will be clear that this represents an improvement on the characteristic obtained by the use of the separately excited field only or the separately excited field and decompounding, which latter characteristic is shown by the line SPD in Figure 3. It also ensures that the generator output can never exceed the prime mover output at any prime mover speed.

Should the prime mover, for any reason, for example due to one cylinder failing, only be capable of delivering a predetermined portion of its output at a particular speed and the field regulator be held in the weak field position due to a fault in the operating mechanism in this regulator, then the generator output must still not exceed the prime mover output at the particular speed in question.

This may be accomplished by arranging that the excitation given by the self field with the regulator in the weak field position is less than the normal minimum excitation required when the prime mover develops its full output, and is approximately equal at the mid point of the hyperbola to that required when the prime mover develops a predetermined portion of its normal full output at a particular speed.

From the foregoing description it will be clear that the invention provides means to prevent the prime mover being overloaded under various running conditions, but it may happen that the prime mover will be overloaded if the self field regulating means sticks or if the prime mover develops considerably less power than its normal power, due to a fault in the prime mover.

Such overloading of the prime mover, if allowed to continue, may result in damaging the prime mover and therefore, according to the invention, means are provided for cutting out the self excited field when the above conditions are met in practice.

Automatic means actuated by an overload sensitive device may be employed for switching the self excited field out of circuit or for giving an audible or visible warning to enable the operator manually to actuate a switch for the same purpose.

In a simple arrangement a switch for putting the self excited field out of action may be inserted in the circuit of the self excited winding, which switch may be actuated by the operator when he is aware of overloading of the prime mover, which condition is readily appreciated.

Figure 6 shows a traction system similar to that shown in Figures 1 and 2, but a delay action trip switch TS is inserted in the circuit of the self excited field SEF.

This switch TS may be solenoid actuated, the circuit for the solenoid being completed by a switch operated by a speed sensitive device S on the prime mover or any moving part directly connected thereto.

It will be clear that if the prime mover is overloaded, the speed sensitive device will complete the circuit to the solenoid by closing switch SW, the external source B¹ energizing the solenoid and thereby switching the self field out of circuit.

In the modification shown in Figure 6a the delay action trip switch TS, instead of being located in the circuit of the self excited field, may, upon continued overloading of the prime mover, be arranged to complete the circuit of an audible electric warning device 50, or a visible device such as a lamp 51 energized by the source B₁ to warn the operator of the condition existing. The operator may then manually actuate a switch 52 in the circuit of the self excited winding SEF to open this circuit, so that the generator output is reduced, and overloading of the prime mover discontinued.

According to a further feature of the invention and in order to provide a number of low tractive efforts for manoeuvring a locomotive having a traction system as hereinbefore described, a resistance or resistances may be inserted in the circuit of the separately excited field in order to weaken this field and thereby reduce the output of the generator below the output of the prime mover at the lowest prearranged prime mover speed.

Referring to Figure 7, the curve H³ represents the output of the generator normally obtained at the first prime mover speed (see Figure 4) and the dotted curve H₃' represents the available output if the prime mover is only capable of giving a predetermined percentage of its normal output at this speed.

The curve M' shows the minimum generator output available with reduced separate excitation only, and the curve M² shows the minimum generator output with reduced separate excitation and self excitation.

It will be clearly seen from this graphical representation that very low tractive efforts may be obtained when it is desired only to move the locomotive and no rolling stock is coupled thereto.

Referring now to Figure 8, which shows the particular circuits of a traction system employing a main generator driven by a prime mover and an auxiliary generator also coupled to the said prime mover and supplying current for charging a battery, G represents the main generator and G¹ an auxiliary generator.

The main generator G has a self excited field SEF, the excitation of which is controlled by a rheostat R, and the main leads A and B of the generator are connected to a traction motor or motors (not shown).

The generator G is also excited by a separate field winding SEP, and this winding is adapted to be energized by being connected across a battery B.

The field AF for the auxiliary generator is separately excited by the same battery B which supplies current to the winding SEP of the generator G.

A controller designated generally by the reference C is provided, and this controller has four positions, namely an off position and first, second and third speed positions, the third speed corresponding to the maximum vehicle speed conditions.

The controller has two sets of contact elements, the first set comprising strips 4, 5, 6, 7 and 8, which are electrically connected together and serve to control the energization of the separate field winding of the main generator and the speed of the prime mover driving this generator.

The second set of contact elements comprises strips 9, 10, 11 and 12, also electrically connected together and serving to control the energization of the field of the auxiliary generator G₁ and the charging of the battery B, under certain conditions which will be hereinafter described.

One pole of the battery B, for example the positive pole, is connected by lead 13 with the strip 4 of the controller C, the strip 5 being connected by a lead 14 with one end of the resistance R₁, the other end of which is connected to one end of the winding SEP. The other end of this winding is connected by a lead 15 with the main return 16 to the negative pole of the auxiliary generator G₁ and through the decompounding winding DEC of this generator and lead 17 with the negative pole of the battery B.

The strip 6 of the controller is adapted to make contact with a lead 18, which is connected with the positive end of the winding SEP.

The strips 7 and 8 are adapted to make contact with leads 19 and 20 respectively, which are connected to solenoid coils 21 and 22 which are utilized for the operation of means controlling the speed of the prime mover. These means do not form part of the present invention and therefore no detailed description of them will be necessary.

Strip 9 of the second set of elements on the control C is adapted to energize a circuit, which will be hereinafter described.

Strip 10 is in communication by means of lead 23 with the positive pole of the battery B through lead 13.

Strip 11 is adapted to make contact with lead 24 which is connected to one end of a resistance R₂, the other end of which is connected to the positive end of the field winding AF of the auxiliary generatory G₁.

The other end of this winding AF is connected to the main return lead 16.

Strip 12 is adapted to make contact with lead 25 with the positive end of the winding AF.

It will be clear that in the "off" position of the controller C the separate winding SEP of the main generator G is not energized, whilst the auxiliary field AF of the auxiliary generator G₁ is energized from the battery through leads 13, 23, strips 10 and 12 and lead 25.

Assuming the prime mover to be running and driving the main and auxiliary generators, current will be supplied by the auxiliary generator to charge the battery, but the main generator remains unexcited since its separate field winding is not energized.

In the first speed position the separately excited winding SEP of the main generator is energized through the resistance R₁, the excitation of the auxiliary generator remaining unchanged.

In the second speed position the same conditions apply as in the first speed position for the separate excitation of the main generator, but the auxiliary generator field F is energized through resistances R₂.

In order to have maximum prime mover power available for driving the main generator in the third speed position, the auxiliary generator field AF is open circuited to prevent generation of current by the auxiliary generator G₁.

Owing to the reduction in battery voltage under the last mentioned conditions, the resistance R₁ associated with the field winding SEP is short circuited and the winding is supplied direct from the battery.

It will be clear from the above that battery charging only takes place when the main generator is not supplying current and in the first and second speed positions, it having been found that under normal conditions sufficient current can be generated during these times to keep the battery B fully charged.

The following conditions may, however, arise:

(a) The battery may become fully charged whilst the auxiliary generator is still supplying current.

(b) When the battery is not being charged, as in (a), its potential may drop during operation at first or second speeds, in which case it will be necessary to recommence charging.

(c) The battery potential may fall during operation under third speed conditions, necessitating resumption of charging, although the controller has open circuited the field winding of the auxiliary generator.

(d) The auxiliary generator may cease charging when the control is in the "off" position, due, for example, to stoppage of the prime mover.

Means are provided according to the invention to take into account the above conditions, and these will be described separately with reference to the above headings:—

(a) The positive pole of the auxiliary generator G₁ is connected to one end of one coil 26 of a reverse relay, the other side of this coil being coupled to one end of the other coil 27 of the relay and to one pole of a contactor 28, the other pole of which is connected to the lead 13 from the battery B. The main lead 29 of the reverse relay coils 26, 27 is taken to one pole of the reverse relay switch 30, the other pole of which is connected by a lead 31 with one fixed contact of a single pole two-way and off switch. The other fixed contact of this switch is connected by a lead 32 with the return lead 16.

The movable arm 33 of the said single pole switch is connected to one end of a solenoid coil 34, the other end of which is connected to the common lead 16. This coil 34 is the operating coil for the contactor 28 and the contactor is provided with an interlocking device 35 which is connected between the positive end of the solenoid relay 34 and the lead 31. The movable arm 33 of the single pole switch is controlled by a thermal relay heater 36 connected across the battery B.

With the auxiliary generator supplying current, and assuming the contactor 28 to be closed, the battery potential may rise to a predetermined high voltage. At this voltage the thermal relay heater 36 will cause the movable arm 33 of the single pole switch to make contact with the contact connected to the lead 32, thereby short circuiting the solenoid coil 34. This coil will thereupon become de-energized and the contactor 28 will open, thereby preventing further charging of the battery.

(b) If the battery potential falls when the auxiliary generator is capable of supplying current, but the contactor 28 is open, the movable arm 33 of the single pole switch controlled by the thermal relay heater 36 will make contact with the fixed contact connected to the lead 31.

Since the generator is at a suitable potential, the switch 30 of the reverse relay will be closed and the solenoid coil 34 will be energized, and the interlock device 35 will be short circuited, and the contactor 28 will be closed and battery charging will recommence.

(c) As above stated, with the controller in the third speed position, the auxiliary generator field F is open circuited, and the generator is therefore incapable of supplying current.

If the battery potential falls, it will be necessary to recommence charging, and this is effected by supplying current from the battery to the auxiliary generator field AF when the battery potential has dropped to a predetermined low voltage.

The strip 9 of the controller in the third speed position makes contact with a lead 37 which is connected to one end of a solenoid coil 38, the other end of which is connected to a fixed contact 39 with which a movable arm 40 is adapted to contact. This movable arm is connected to the common return lead 16 and is under the control of the thermal relay heater 36.

The solenoid 38 controls a contactor 41 in a lead 42 from the battery B to one end of a resistance $R_3$, the other end of which is connected to that end of the resistance $R_2$ which is not connected to the auxiliary field winding AF.

Associated with this contactor there is an interlock device which is shown in the form of a contactor 43 which is connected between the contact 39 and the return lead 16 and is also under the control of the solenoid 38.

With the controller in the third speed position, when the battery potential falls, the movable arm 40 will make contact with the contact 39 and current will flow from the battery via leads 13, 23, strips 10, 9 and lead 37, through the solenoid coil 38 and the return lead 16.

The contactors 41 and 43 will be closed by the energization of the solenoid coil 38 and current will be supplied from the battery through the resistance $R_3$ and $R_2$ to the auxiliary generator field AF. Excitation of this generator will thus be produced and battery charging will be resumed.

The contactor 43 serves to hold the contactor 41 in the closed position by maintaining the solenoid 38 energized when the movable arm 40 leaves the contact 39, due to the rise of potential of the battery B consequent upon the resumption of battery charging and retains the contactor 41 closed until the controller C is moved to one of the lower speed positions when the solenoid 38 is de-energized and the contact 41 opens.

If the battery becomes charged to the predetermined highest potential the contactor 28 will be opened as above described.

(d) If the auxiliary generator ceases charging, due, for example, to the stoppage of the prime mover, the battery must be prevented from discharging through the auxiliary generator armature.

The reverse relay above described in conjunction with the contactor 28 performs this function since upon reverse current flow from the battery to the generator when the generator is not charging, the reverse relay switch 30 will open and thereby de-energize the solenoid coil 34, the contactor 28 will open, and further current flow from the battery will be prevented.

It will be clear that by the arrangement above described and shown in Figure 8 several advantages are obtained. These may be enumerated as follows:—

1. The charge rate to the battery is kept substantially constant when the prime mover speed increases by weakening the auxiliary generator field and strengthening this field when decrease of prime mover speed occurs.

2. The master controller which controls the output of the main generator and the speed of the prime mover also controls the strength of the auxiliary generator field.

3. The auxiliary generator is provided with a decompounding winding so as to give a drooping characteristic curve in order to minimize current surges during transient conditions when changing from one prime mover speed and auxiliary generator field strength to another.

4. Means are provided for disconnecting the battery from the auxiliary generator when the battery is fully charged.

5. Means are provided to ensure that battery charging normally does not take place when the prime mover is running at maximum speed and developing maximum output. This ensures that the whole of the prime mover output is available for traction purposes.

6. When the prime mover is being run at maximum speed, and battery charging is therefore not taking place, means are provided to ensure that the excitation due to the separate field winding of the main generator remains substantially constant in spite of the fall of potential of the battery.

7. Means are provided whereby battery charging may be resumed although the prime mover is running at its maximum speed and the auxiliary generator is not therefore normally in a condition to supply current to the battery.

It will be clear from the foregoing specification that a prime mover-electric traction installation in accordance with this invention comprises improved features and protective devices to ensure trouble free operation under all conditions.

The various devices are of simple character and wholly efficient in operation.

Having now described our invention, what we claim as new and desire to secure by Letters Patent is:—

1. A prime-mover-electric traction installation for vehicles comprising a generator, a traction motor in electrical connection with the generator, a separately excited field winding for the generator of such dimensions that it is capable of exciting the generator so that the output thereof for one speed only of the traction motor substantially equals the prime mover output, a self excited field winding for the generator, and means for regulating the same such that the self excited field winding gives such additional excitation that the said means handles only the minimum wattage in making the generator output substantially equal to the prime mover output at all speeds of the traction motor.

2. A prime-mover-electric traction installation for vehicles comprising a generator, a traction motor in electrical connection with the generator, a separately excited field winding for the generator of such dimensions that it is capable of exciting the generator so that the output thereof for one speed only of the traction motor substantially equals the prime mover output, a self excited field winding for the generator, and means for regulating the same so that for any prime mover speed the generator output may correspond to the varying requirements of the traction motor at varying vehicle speeds.

3. A prime-mover-electric traction installation for vehicles comprising a generator, a traction motor in electrical connection with the generator, separately excited, self excited and decompounding field windings for the generator, the generator characteristic obtainable with the separately excited and decompounding windings only being such that for a predetermined constant prime mover power the generator output substantially equals the prime mover output at one speed only of the traction motor, and regulating means for varying the energization of the self excited field winding so that the generator output substantially equals the prime mover output at all vehicle speeds and all prime mover speeds.

4. A prime-mover-electric traction installation for vehicles comprising a generator, a traction motor in electrical connection with the generator, separately excited, self excited and decompounding windings for the generator, the generator characteristic obtainable with the separately excited and decompounding windings only being such that for a predetermined constant prime mover power the generator output substantially equals the prime mover output at one speed only of the traction motor and the maximum current generated does not exceed the maximum permissible current for the traction motor, and regulating means for varying the energization of the self excited winding so that the generator output substantially equals the prime mover output at all vehicle speeds and all prime mover speeds and the said regulating means handles only the minimum wattage.

5. A prime-mover-electric traction installation for vehicles comprising a generator, a traction motor in electrical connection with the generator, separately excited, self excited and decompounding field windings for the generator, the generator characteristic obtainable with the separately excited and decompounding windings only being such that for a predetermined constant prime mover power the generator output substantially equals the prime mover output at one speed only of the traction motor, and regulating means for varying the energization of the self excited field winding in order that the generator output may not exceed the said predetermined prime mover output at all vehicle speeds.

6. A prime-mover-electric traction installation for vehicles comprising a generator, a traction motor in electrical connection with the generator, separately excited and decompounding field windings for the generator of such dimensions that they are capable of exciting the generator so that the output thereof at any prime mover speed cannot exceed the output of the prime mover when only a predetermined portion of the normal prime mover output is available at any prime mover speed, a self excited field winding for the generator, and means for regulating the same in order that the generator output may not exceed the reduced prime mover output at any vehicle speed and any prime mover speed.

7. A prime-mover-electric traction installation for vehicles comprising a generator, a traction motor in electrical connection with the generator, a self excited field winding for the generator, means for controlling the excitation given by the self excited field winding, and separately excited and decompounding field windings for the generator of such dimensions that they are capable of exciting the generator so that the output thereof cannot exceed the output of the prime mover when only a predetermined portion of the normal prime mover output is available at any prime mover speed and the self excited field winding is open circuited.

8. A prime-mover-electric traction installation for vehicles comprising a generator, a traction motor in electrical connection with the generator, separately excited and decompounding field windings for the generator of such dimensions that they are capable of exciting the generator so that the output thereof for one speed only of the traction motor substantially equals the prime mover output, a self excited field winding for the generator, and means for weakening the excitation given by the separately excited field winding to reduce the output of the generator below the output of the prime mover at the lowest prime mover speed, even if the prime mover output is only a predetermined portion of the output normally available at this speed.

9. A prime mover-electric traction installation for vehicles comprising a generator, a traction motor in electrical connection with the generator, separate and self excited field windings for the generator, regulating means for controlling the excitation given by the self excited field winding and means responsive to an overload condition of the prime mover for switching the self excited field winding out of circuit.

10. A prime mover-electric traction installation for vehicles comprising a generator, a traction motor in electric connection with the generator, separate and self excited field windings for the generator, regulating means for controlling the excitation given by the self excited field winding, and means responsive to engine speed for switching the self excited field winding out of circuit if the said regulating means inadvertently remains in a position in which overloading of the prime mover occurs.

11. A prime mover-electric traction installation for vehicles comprising a generator, a traction motor in electrical connection with the generator, separate and self excited field windings for the generator, regulating means for varying the excitation given by the self excited field winding, and means for switching the self excited field winding out of circuit if the prime mover develops less than a predetermined portion of its normal output for longer than a predetermined time.

12. A prime mover-electric traction installation for vehicles comprising a generator, a traction motor in electrical connection with the generator, separate and self excited field windings for the generator, regulating means for varying the excitation given by the self excited field winding and means responsive to an overload condition of the prime mover for actuating a warning device.

13. A prime mover-electric traction installation for vehicles comprising a main generator, a traction motor in electrical connection with the generator, self excited and separately excited field windings for the generator, means for controlling the excitation of the self excited field winding, a battery for energizing the separately excited field winding, an auxiliary generator driven by the prime mover which drives the main generator, the output of which is used to charge the battery, a field winding for the auxiliary generator energized by the battery, and means for weakening the excitation given by the auxiliary generator field when the prime mover speed increases and vice versa.

14. A prime mover-electric traction installation for vehicles as claimed in claim 13, in which the auxiliary generator has a decompounding field winding in addition to the battery excited winding in order to minimize current surges when changing from one prime mover speed and auxiliary generator field strength to another.

15. A prime mover-electric traction installation for vehicles as claimed in claim 13, in which means are provided for disconnecting the battery from the auxiliary generator when the battery is fully charged.

16. A prime mover-electric traction installation for vehicles comprising a main generator, a traction motor in electrical connection with the generator, self excited and separately excited field windings for the generator, means for controlling the excitation of the self excited field winding, a battery for energizing the separately excited field winding, an auxiliary generator driven by the prime mover which drives the main generator, the output of which is used to charge the battery, a field winding for the auxiliary generator energized by the battery, electrically operated means for controlling the speed of the prime mover, means for varying the excitation given by the auxiliary generator field, and a master controller for controlling the operation of the said means.

17. A prime mover-electric traction installation for vehicles as claimed in claim 16 in which the means for weakening or strengthening of the excitation given by the auxiliary generator field winding comprise resistances placed in circuit with or disconnected from the said field winding.

18. A prime mover-electric traction installation for vehicles comprising a main generator, a traction motor in electrical connection with the generator, self excited and separately excited field windings for the generator, means for controlling the excitation of the self excited field winding, a battery for energizing the separately excited field winding, an auxiliary generator driven by the prime mover which drives the main generator, the output of which is used to charge the battery, a field winding for the auxiliary generator energized by the battery, electrically operated means for controlling the speed of the prime mover, means for varying the excitation given by the auxiliary generator field, means for suspending battery charging, and a master controller for controlling the operation of all the above said means.

19. A prime mover-electric traction installation for vehicles as claimed in claim 18 in which the means for suspending battery charging comprises a resistance inserted in the auxiliary generator field circuit by the master controller.

20. A prime mover-electric traction installation for vehicles comprising a main generator, a traction motor in electrical connection with the generator, self excited and separately excited field windings for the generator, means for controlling the excitation of the self excited field winding, a battery for energizing the separately excited field winding through a resistance, an auxiliary generator driven by the prime mover which drives the main generator, the output of which is used to charge the battery, a field winding for the auxiliary generator energized by the battery, electrically operated means for controlling the speed of the prime mover, means for varying the excitation given by the auxiliary generator field, means for suspending battery charging, means for cutting out the resistance in the circuit of the separately excited field winding of the main generator to compensate for reduction in the battery potential when charging is interrupted and a master controller for controlling the operation of all said means.

21. A prime mover-electric traction installation for vehicles comprising a main generator, a traction motor in electrical connection with the generator, self excited and separately excited field windings for the generator, means for controlling the excitation of the self excited field winding, a battery for energizing the separately excited field winding through a resistance, an auxiliary generator driven by the prime mover which drives the main generator, the output of which is used to charge the battery, a field winding for the auxiliary generator energized by the battery, electrically operated means for controlling the speed of the prime mover, means for varying the excitation given by the auxiliary generator field, means for suspending battery charging, means for cutting out the resistance in the circuit of the separately excited field winding of the main generator to compensate for reduction in the battery potential when charging is interrupted, means for permitting battery charging to take place when the battery voltage falls to a predetermined low figure, and a master controller for controlling the operation of all said means.

DONALD JOHN WATKINS.
JOHANN HERMANN ABBINK-SPAINK.
DONALD CHALLIS PLYER.